United States Patent
Lu

(10) Patent No.: US 8,856,462 B2
(45) Date of Patent: Oct. 7, 2014

(54) REDUCING RUN TIME IN SEISMIC IMAGING COMPUTING

(71) Applicant: International Business Machines Corporation, Armonk, NY (US)

(72) Inventor: Ligang Lu, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 13/679,642

(22) Filed: Nov. 16, 2012

(65) Prior Publication Data

US 2014/0140174 A1     May 22, 2014

(51) Int. Cl.
G06F 12/02 (2006.01)
G01V 1/34 (2006.01)
G06F 12/08 (2006.01)

(52) U.S. Cl.
CPC ............... *G01V 1/345* (2013.01); *G06F 12/08* (2013.01)
USPC .......................................................... 711/153

(58) Field of Classification Search
CPC ................................. G06F 12/08; G06F 9/544
See application file for complete search history.

(56) References Cited

U.S. PATENT DOCUMENTS

| | | | |
|---|---|---|---|
| 5,930,730 A | 7/1999 | Marfurt et al. | |
| 5,999,488 A * | 12/1999 | Smith | 367/50 |
| 7,196,969 B1 * | 3/2007 | Karazincir | 367/50 |
| 8,103,453 B2 | 1/2012 | Abma | |
| 2010/0054082 A1 | 3/2010 | McGarry et al. | |
| 2011/0320180 A1 | 12/2011 | Al-Saleh | |
| 2012/0014218 A1 | 1/2012 | Houck et al. | |
| 2012/0026830 A1 | 2/2012 | Wang et al. | |
| 2012/0026833 A1 | 2/2012 | Soubaras et al. | |

FOREIGN PATENT DOCUMENTS

CN     101876714 A     11/2010

OTHER PUBLICATIONS

Gray et al., "Seismic migration problems and solutions", Geophysics 66, 1622, 2001.

* cited by examiner

*Primary Examiner* — Hiep Nguyen
(74) *Attorney, Agent, or Firm* — Scully, Scott, Murphy & Presser, P.C.; Daniel P. Morris, Esq.

(57) ABSTRACT

A system, method and computer program product for seismic imaging implements a seismic imaging algorithm utilizing Reverse Time Migration technique requiring large communication bandwidth and low latency to convert a parallel problem into one solved using massive domain partitioning. Since in RTM, both the forward and reverse wave propagation is iteratively calculated on time step increments, the method implements methods that includes partitioning memory between computation and intermediate results to optimize an RTM computation. The methods make maximum use of the memory to either eliminate storing the snapshot wavefield data to disk, or hide all or a significant portion of the disk I/O time. Furthermore, the schemes can provide the flexibility to vary a number of iterations (step size) for each snapshot to be kept in the memory. If any of the given conditions changes during the process, maximum usage of the available memory is ensured.

13 Claims, 7 Drawing Sheets

REDUCING RUN TIME IN SEISMIC IMAGING COMPUTING

The present invention relates generally to seismic imaging systems and processes, and particularly, to improvements related to systems and processes of seismic imaging techniques, such as Reverse Time Migration (RTM) and Full Waveform Inversion (FWI).

BACKGROUND

Seismic imaging is the process of converting acoustic measurements of the Earth into images of the Earth's interior, much like ultrasound for medical imaging. It is widely used in oil and gas exploration and production to identify regions that are likely to contain hydrocarbon reservoirs and to help characterize known reservoirs to maximize production. These methods have become critical to the energy industry as known reserves are used up and new reserves become increasingly difficult (and expensive) to find and are increasingly in technically challenging areas, like the deep sea. For the past several decades, the energy industry has tried to balance the need to image quickly and the need to image accurately. The need for accuracy is driven by the high cost of drilling a "dry" well due to poor imaging (a deep sea well can cost over $100 million) and the need for quick imaging is driven by the cost of not finding new reserves (i.e., bankruptcy). To minimize these costs, the industry relies on supercomputing clusters and regularly increases compute power, enabling both faster imaging on existing algorithms and the practical implementation of more accurate imaging. Thus, the development of fast, efficient methods for imaging is of high importance to the industry.

Seismic imaging data varies widely depending on how and where the data is collected (e.g., on land, at sea, at the ocean surface, at the ocean floor, below ground, electromagnetically, etc). One data collection method in particular implements a towed hydrophone receiver arrays for ocean seismic data collection. The basic idea is shown in FIGS. 1 and 2 depicting a ship 200 shown towing a 2D array 212 of hydrophones spaced about every 25 m on 1 to 16 trailed streamers. Every 15 or so seconds, an air cannon is fired into the water creating an acoustic wave, e.g., a shot 209 that propagates through the water and into the Earth. As shown in FIG. 2, reflections 202 in a forward direction from various surface and subsurface boundaries cause echoes that reflect back and are recorded by each hydrophone in the array 212. The recording of a single hydrophone in time as a trace and the collection of traces for a single firing of the air cannon is called a common shot gather, or shot 211. As the ship 200 moves, a large set of spatially overlapping shots is recorded. Depending on the size of the survey region to be imaged, this data collection can take a month or more and is designed to get the maximal coverage of the area to be imaged. The receiver data R(x, y, z, t) collected for potentially hundreds of thousands of shots is the result of some source data S(x, y, z, t) from shots 209 at particular locations.

Two critical requirements drive production seismic imaging: The need for improved imaging to accurately locate and characterize elusive oil and gas reservoirs; and the need for timely subsurface imaging. Drilling too soon risks expensive dry wells while drilling too late risks delaying the time to oil. To minimize these risks, the industry regularly increases the power of its supercomputing clusters, enabling both faster imaging on existing algorithms and the practical implementation of more accurate imaging. However, raw supercomputing power is not enough. It is equally important—if not more so—to implement algorithms efficiently based on a detailed knowledge of the hardware.

The Reverse Time Migration (RTM) algorithm (see, e.g., Gray, S. H., Etgen, J., Dellinger, J., Whitmore, D., Seismic migration problems and solutions, Geophysics 66, 1622, 2001) is widely used in the industry because of its superior imaging accuracy for difficult subsurface structures like salt domes which are poorly imaged by other algorithms but which are very effective at trapping oil and gas. Several variants of RTM exist with differing degrees of approximation to reality, all of which use single-precision arithmetic.

In seismic imaging techniques has processed shot gathers individually on a single compute node so that they could be processing in parallel. This approach has many benefits; but for algorithms like RTM, as computational power increases, data input and output (I/O) becomes the single largest performance bottleneck, particularly when the model is large.

The RTM algorithm arises from the observation that pressure waves should be correlated at reflection boundaries; so RTM proceeds by correlating two pressure waves (called the forward and backward waves) to find those boundaries. To generate the waves for correlation, RTM simulates wave propagation using the wave equation for a wave that includes: generating a forward wave calculation $P_S(x,y,z,t)$ from equation 1) given a source data term S(x, y, z, t) representing the source "shot" or sound wavefield 209 as shown in FIG. 2, $$\left[\partial_x^2 + \partial_y^2 + \partial_z^2 - \frac{1}{v^2(x, y, z)}\partial_t^2\right]P_S(x, y, z, t) = S(x, y, z, t) \qquad 1)$$

and generating a backward (or reverse) wavefield calculation $P_R(x,y,z,t)$ simulating backward wave propagation 204 using the wave equation from equation 2) given the receiver data R(x, y, z, t) collected by the receiver arrays 212 according to:

$$\left[\partial_x^2 + \partial_y^2 + \partial_z^2 - \frac{1}{v^2(x, y, z)}\partial_t^2\right]P_R(x, y, z, t) = R(x, y, z, t) \qquad 2)$$

The forward wavefield computation corresponds to the waves 202 generated from the air cannon firing and propagating forward in time using a "velocity model" represented by V(x,y,z), which specifies the wave velocity at each point in space and represents the various material properties and boundaries of the volume being imaged. The air cannon firing is treated as a wavelet impulse localized in time and space. As shown in FIG. 2, the backward wavefield computation is generated by using the shot data recorded (received) by the hydrophone array as the source term for the wave equation and propagating that as backward propagating waves 204 backward in time. These two waves are then multiplied pointwise at each time step to generate an image, using the following "imaging condition" as shown in equation 3) as follows:

$$I(x,y,z) = \Sigma_t P_S(x,y,z,t) P_R(x,y,z,t) \qquad 3)$$

where $P_S(x,y,z,t)$ is the reflected forward power pressure wave at a coordinate and $P_R(x, y, z, t)$ is the reverse power pressure wave at an x, y, z coordinate at a time t.

This process is repeated for all shots in the seismic survey and the images generated are summed to create a final image of the reflecting boundaries, which represent the subsurface structure. It is important to note that the time summation in the imaging condition implies that the first time step of the forward wave needs to be correlated with the last time step of the backward wave. This constraint is typically handled in one of two ways: either the forward wave is saved to disk (called a "snapshot") every several time steps and read in for imaging when the backward wave is computed, or the forward propagation is run twice—once forward in time and once in reverse time using boundary data saved from the forward pass to recreate the forward pass in reverse—and then imaging proceeds with the backward wave and the reverse forward wave.

As shown in FIG. 3, a velocity model V( ) 225 is depicted with each sub-block 28 representing a sub-set of the model data (e.g., sub-domain) corresponding to a single shot that is stored in a corresponding disk. For calculating an image, the entire model is not needed, e.g., a sub-set of the model is used for a selected shot. A master processing node 30 in communication with a memory storage device, e.g., database 235, is programmed to allocate a RTM compute cluster 240 including a plurality of slave nodes 245, each node 245 having a corresponding memory storage device 250. Each slave node 245 is in communication with the master node 230 and is configured to obtain and process the single shot data 228a. When a (forward or reverse) pressure wave and resulting image is calculated at a respective node, it is stored to the main memory storage disk 250. Memory storage devices 250 that store intermediate results data in calculating the forward or reverse pressure wave which values are used to calculate resulting image are referred to as "Scratch" disks. RTM compute clusters 40 have significant per-node scratch disk requirements for saving snapshot data, which for a $1024^3$ model and 10,000 time steps would require 40 TB of snapshot storage—per shot. In practice, snapshot sub-sampling is used to reduce both disk requirements and disk I/O bottlenecks; however sub-sampling results in image degradation and must be balanced with performance. Compression can be used to trade computation for disk I/O, however, lossless compression may not obtain required compression ratio and lossy compression will also degrade image quality.

The velocity model 225 is the representation of the velocity of the wave traveling at an x, y, z coordinate in the sub-surface of the earth, and, for purposes of description, is referred to as $V^2$. As velocity model 225 is not known in the RTM process, an imaging condition enables the snapshot of the wave at a particular point in time after calculating forward wave and backward waves. For every value of t there is produced an image from an average of many shots. When averaging many shots, the image at a coordinate at a time t, i.e. I(x, y, z) is obtained via the imaging condition according to equation 3) above.

For the forward motion calculation, the velocity model v(x,y,z) is loaded, the pressure wave is loaded at time t and the previous pressure wave at time t−1, i.e., P(x,y,z,t−1), and the next pressure wave P(x,y,z,t+1) is computed (bootstrap) and is stored. This process is performed at each iteration (time step t). The wave field is a 3-D object and is very large (e.g., on the order of $1024^3$ elements). Thus, for example, at four bytes of data for each calculation, this may amount to 4 GBytes of data for 1 time step of the algorithm for a single shot) and there may be thousands of time steps amounting to over 24 TB of data for a single shot which, when sent out to disk, is time consuming. Thus in practice, in an effort to reduce the data, the data is not stored or calculated at every time step, i.e., the calculated $P_S(x,y,z,t)$ is either stored or loaded to disk every $N^{th}$ iteration.

Due to the advances in the compute systems, industries have started to adopt more and more computational intensive seismic imaging algorithms, such as Reverse-Time Migration (RTM) and Full Waveform Inversion (FWI), for oil exploring.

These algorithms require thousands or even tens of thousands of iterations on large 3D models, typically 1000×1000×1000, to propagate the waveform in the forward time stepping loop. During the forward loop, each iteration or every a few iterations, the current intermediate wavefield (also called snapshot) needs to be saved. Then, in the backward time stepping loop, the corresponding saved wavefield will be read back to correlate with the current wavefield for imaging condition. Because of the large amount of the data and number of the snapshot wavefields to be saved, they typically are saved to disk. However, thousands of times of disk writing and reading of large data set time consume and the I/O of these snapshots becomes a performance bottleneck and makes the seismic imaging computation very slow.

Some prior art solutions additionally save only the boundaries of the wavefields. However, this solution requires recalculation of the entire wavefield when it is needed in imaging condition. It costs additional computation time roughly as the forward loop.

Another solution is to compress the data before saving it to the disk. Such solution requires compression and decompression time. Also, the lossless compression only has small compression ratio and lossy compression can have high compression ratio but causes distortion.

Therefore, there is needed improved methods for reducing disk I/O time, i.e., time required to write to disk intermediate wavefield compression data in both forward and reverse time paths, and improve the performance over the prior art solutions.

SUMMARY

For RTM and in FWI, wherein the forward wave propagation is iteratively calculated on time step increments, schemes are provided to adaptively keep as many of the snapshots in available memory as possible. These schemes can eliminate or significantly reduce the disk I/O time and compression/decompression time, and therefore the seismic imaging computation time.

In one aspect there is provided a method for managing available memory at computing devices to reduce seismic imaging computation time. The method comprises:

partitioning a model space volume as domains over a multiple number of computing nodes, each node having one or more associated processors and a first local memory storage device;

assigning each partitioned domain to a one or more processing nodes of a parallel computer device interconnected through one or more communication networks;

determining an available amount of first local memory storage at each node;

determining a sub-volume size per node corresponding to domain model processing;

determining from the available amount of first memory and sub-space volume size a first amount of iterations corresponding to determined time steps at which forward wave propagation data is computed for storage;

wherein during an iterative processing in a forward wavefield propagation calculation path, storing computed forward wavefield data contributions for the first amount of time steps needed to a second external memory storage device; and, in each remaining time steps, storing the computed forward wavefield data contributions in the available first memory; and, wherein during an iterative processing in a backward wavefield propagation calculation path, using the stored computed forward wavefield data contributions from the available first memory during the first amount of time steps to compute reverse wave propagation data in the backward calculation path, and in a remaining time steps, using the stored computed forward wavefield data contributions from the second memory storage device to compute reverse wave propagation data; and, computing, using the stored forward wave propagation data and reverse wave propagation data, an image at each node, and, merging the computed images from each node to create a final image wherein a delay latency due to storing and using forward wave propagation operations is minimized.

In a further aspect, there is provided a system for managing available memory at computing devices to reduce seismic imaging computation time. The system comprises:

a programmed processor unit; and
a first local memory storage device coupled to the programmed processor unit, the processor unit programmed to perform a method comprising:

partitioning a model space volume as domains over a multiple number of computing nodes, each node having an associated processor and a first local memory storage device;

assigning each partitioned domain to a one or more processing nodes of a parallel computer device interconnected through one or more communication networks;

determining an available amount of the first local memory storage at each node;

determining a sub-volume size per node corresponding to domain model processing;

determining from the available amount of first memory and sub-space volume size a first amount of iterations corresponding to determined time steps at which forward wave propagation data is computed for storage;

wherein during an iterative processing in a forward wavefield propagation calculation path, storing computed forward wavefield data contributions for the first amount of time steps needed to a second external memory storage device; and, in each remaining time steps, storing the computed forward wavefield data contributions in the available first memory; and, wherein during an iterative processing in a backward wavefield propagation calculation path, using the stored computed forward wavefield data contributions from the available first memory during the first amount of time steps to compute reverse wave propagation data in the backward calculation path, and in a remaining time steps, using the stored computed forward wavefield data contributions from the second memory storage device to compute reverse wave propagation data; and, computing, using the stored forward wave propagation data and reverse wave propagation data, an image at each node, and, merging the computed images from each node to create a final image wherein a delay latency due to storing and using forward wave propagation operations is minimized.

A computer program product is provided for performing operations. The computer program product includes a storage medium readable by a processing circuit and storing instructions run by the processing circuit for running a method.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

A system, method and computer program product for seismic imaging implements a seismic imaging algorithm utilizing Reverse Time Migration technique requiring large communication bandwidth and low latency to convert a parallel problem into one solved using massive domain partitioning. Since in RTM and FWI, both the forward and reverse wave propagation is iteratively calculated on time step increments, the method includes partitioning memory between computation and intermediate results to optimize an RTM computation.

In particular, the system and method judiciously and adaptively stores as many of the snapshots in an available memory as possible when performing RTM seismic imaging. The system and method can eliminate or significantly reduce the disk I/O time and compression/decompression time, and therefore the seismic imaging computation time.

Figure 1:
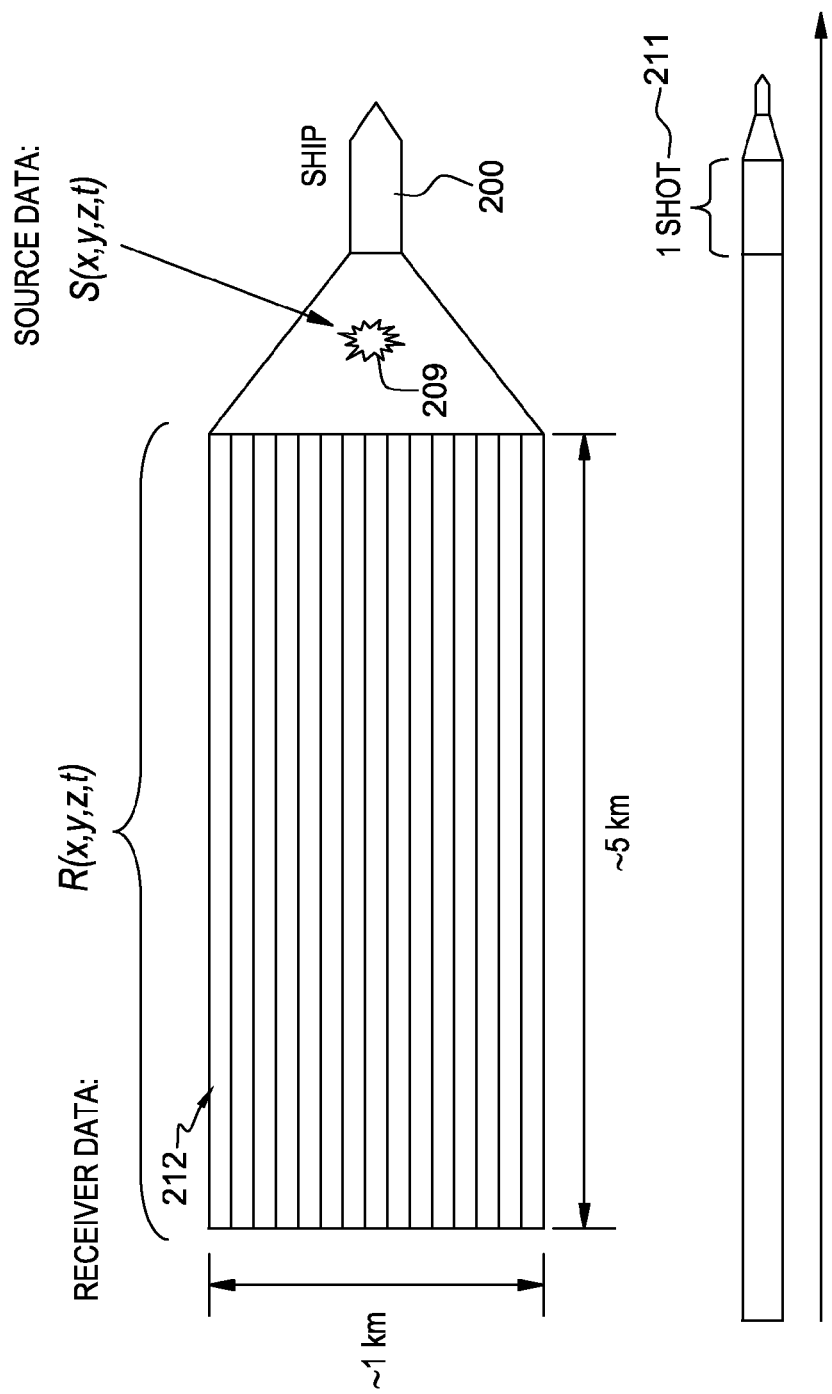
FIG. 1 depicts one RTM seismic data collection method implementing a towed hydrophone receiver arrays for ocean seismic data collection.
Figure 2:
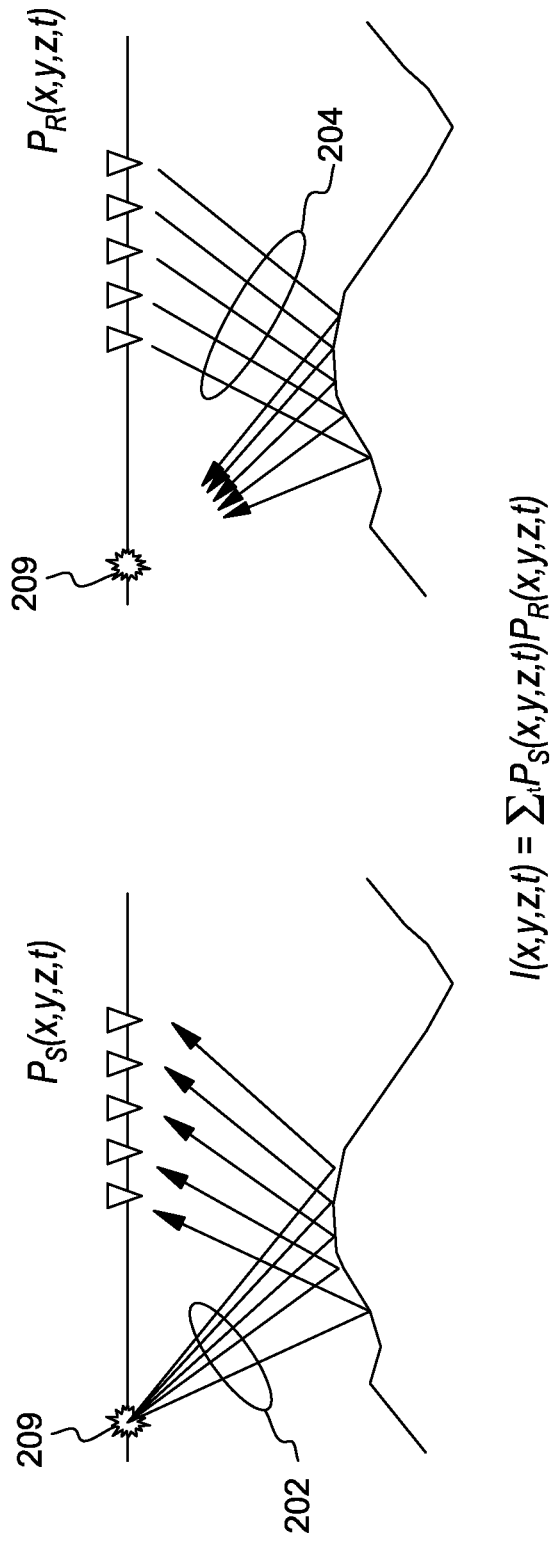
FIG. 2 depicts an example RTM imaging computation for generating the imaging condition from computed forward wave $P_S(x,y,z,t)$ and reverse wave $P_R(x,y,z,t)$ propagations.
Figure 3:
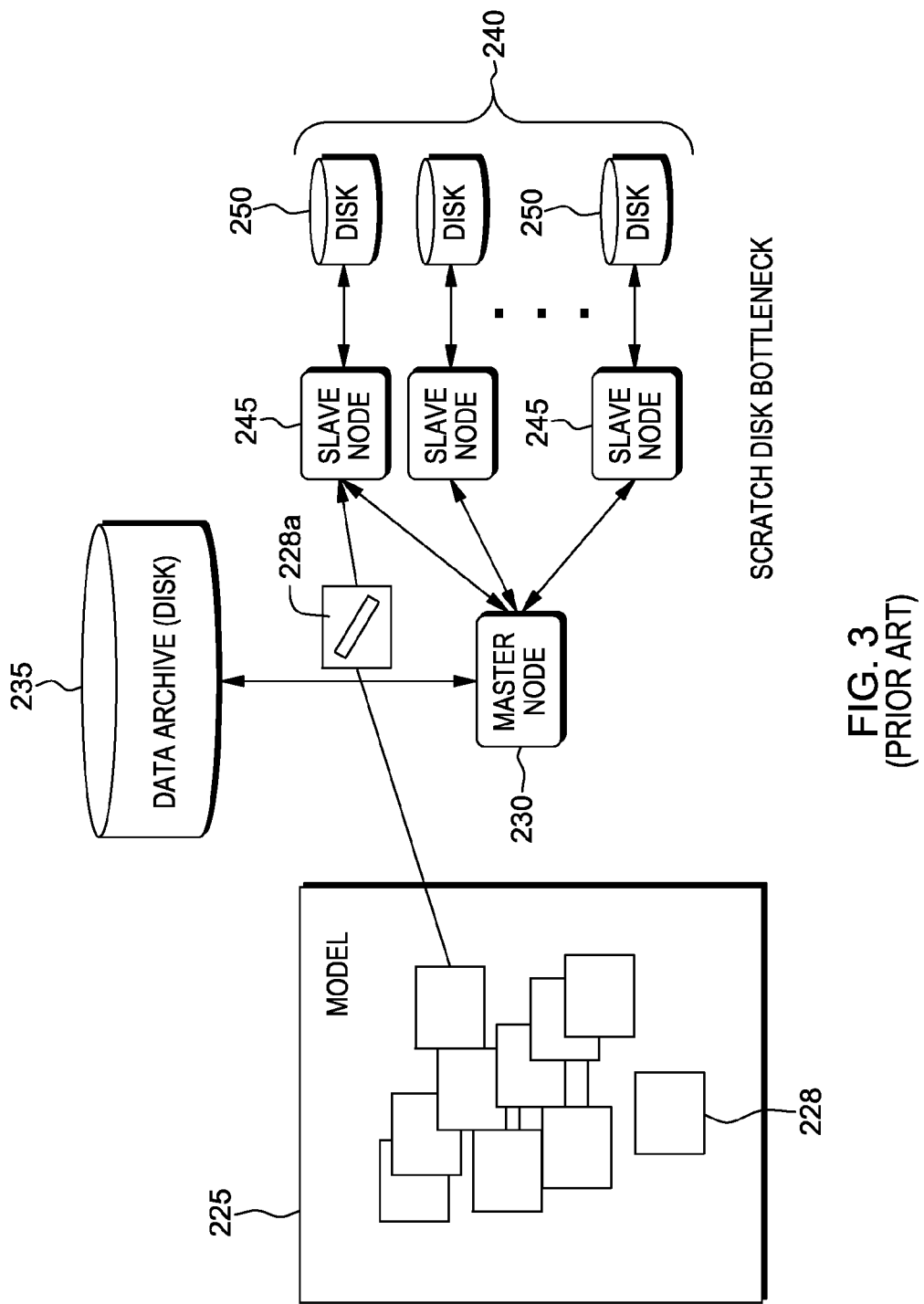
FIG. 3 shows parallel implementation of RTM that typically run individual shots on a node of a compute cluster and run many shots in parallel wherein the node implements scratch disk storage.
Figure 4:
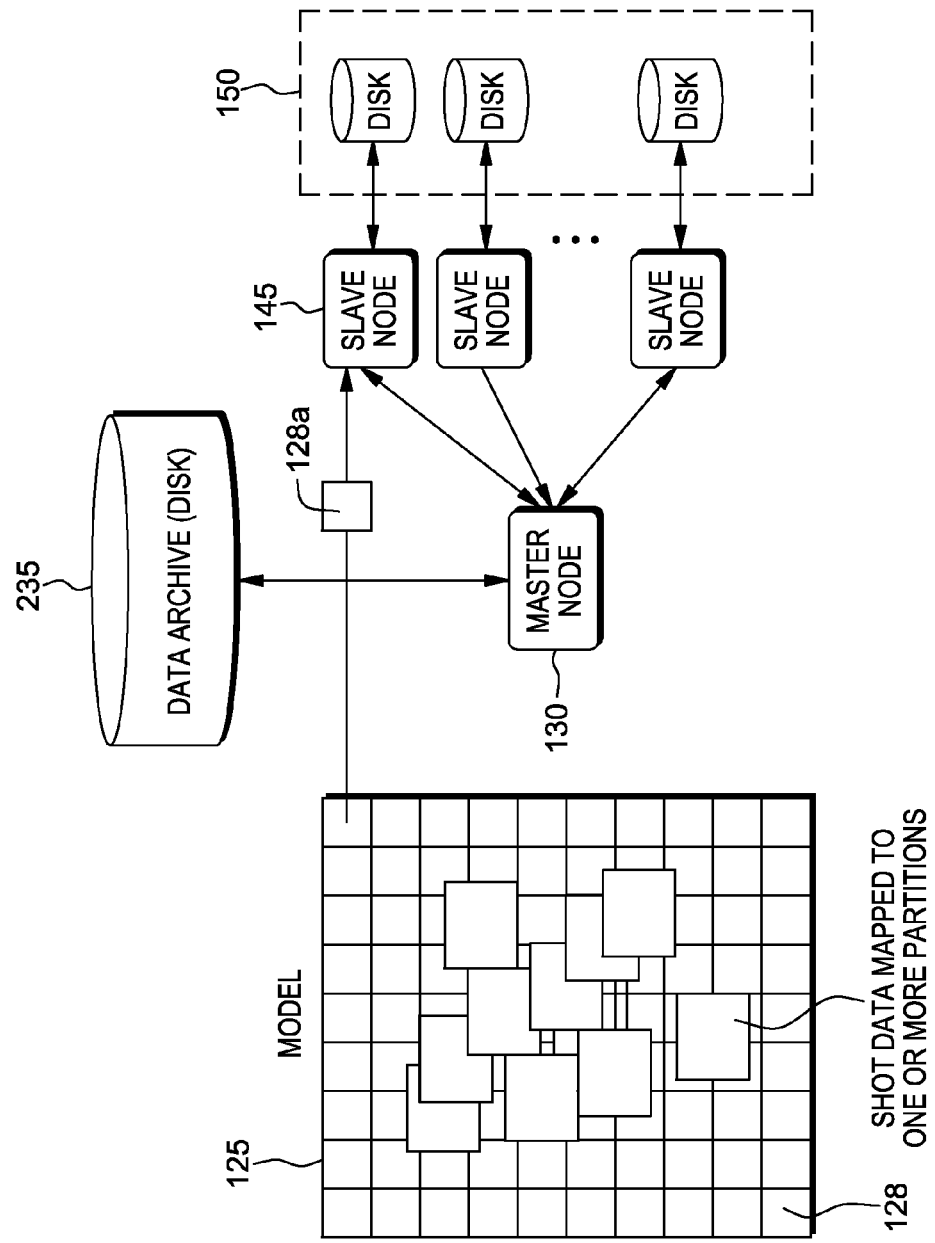
FIG. 4 depicts a velocity model volume being partitioned into sub-volume that each is individually assigned to a respective slave node for computing a sub-image, during which the generated intermediate data may be stored locally at a compute node, or via external storage.

Thus, referring to FIG. 4 there is depicted the velocity model 125 that is partitioned into sub-volumes 128 that each individually is assigned to a respective slave node 145 in a massively parallel multi-node computing system such as the Blue Gene® computing system, using algorithms as described herein. Any shot data within that object is thus assigned to and processed by that slave node. In the embodiment depicted, all data may be processed at once with domain decomposition. Any compute system with many nodes or processors, such as a Blue Gene supercomputer, or a compute cluster or a compute cloud, etc., can be used.

In one non-limiting embodiment, the partitioning of the velocity model 125 is performed according to a uniform spatial partitioning scheme, in which each dimension of the model is divided into equal- or approximately equal-sized groups of points creating the blocked structures. In another embodiment, the partition can be done non-uniformly so as to balance the amount of work required for each block. The configurability of the partitioning may be motivated by minimizing the run time. In such an embodiment, the block would not be necessarily the same size.

Rather than processing each shot data in parallel, a slave node 145 may receive data 128a from multiple shots, i.e., shots (shot data) being partitioned among the slave nodes 145 of a cluster. Via partitioning, the 3D velocity model with a model size of $1024^3$ which may amount to ~4 GBytes of data for 1 time step of the RTM imaging algorithm for a single shot and there may be thousands of time steps)) is thus divided, e.g., amongst "Np" slave nodes 145; therefore, for example, for Np=1000 slave nodes, with partitioning, each slave node would need only enough memory to process its assigned part of the velocity model (e.g., 4 MB of the model). For example, in industry, the typical total time steps are 15000~20000, so if snapshot saving frequency is ⅕, the node needs to store 3000~4000 snapshots, i.e., 3000~4000×4MG=12~16 GB which fits into BlueGene Q nodes' memory. Thus, via partitioning, each slave node 145 may have enough local memory to manage processing of the velocity model portion with or without having to store data in the scratch disk. That is, it is attempted to keep the entire model and associated intermediate snapshots of wavefield data in memory at each slave node, obviating the need for scratch disk, and the attendant disk-bandwidth bottleneck.

In one embodiment, the method for calculating the RTM imaging condition is run in a parallel computing system such as Blue Gene® computing system. First, there is input to the nodes of the system a data set including the velocity model v(x,y,z) and associated model parameters (e.g., isotropic, VTI (Vertical Transverse Isotropy), TTI, (Tilted Transverse Isotropy)) which are loaded to the respective local node memories. The parameters are run to configure the node for the RTM seismic imaging processing. For example, these may include the code execution parameters, i.e., the model size (e.g., the size(s) of the model partitioning as determined by details of the hardware implementations—e.g., IBM Power7, Blue Gene®, Intel Xeon Westmere clusters, etc.), local node memory size, the iteration numbers, the snapshot frequency, etc. Further input as part of data set are the Shot Data (Source/Receiver Data); the source data being created by an air cannon or other acoustic source but is modeled using a "wavelet" (a finite wave that can be represented in numerous ways as known to those skilled in the art). There are many specific wavelets that can be used, e.g., a Ricker wavelet in one implementation. The receiver data on the other hand is specifically recorded using the recording devices and it is these measurements that are used in the backward processing stage as input.

After configuring the domain partitioned nodes, the source and receiver data are read from the storage device, whether external disk or locally. Depending upon the method, the embodiment considers that shot data may be incrementally obtained, e.g., according to a predetermined period or time interval. For example, shot data for that node may be obtained every k time steps.

Then, the data is read as needed by the node. Data is read incrementally (i.e., the data is read as needed, not as the whole), and is usually read at shot frequency or subshot frequency. Data is read from where the data is stored, e.g., either local compute node storage, or the remote storage disk, and distributed for processing at each node. In one aspect, the method described herein adaptively computes an amount of the data (e.g., including input data, receiver data, temporary calculations results, or intermediate result data) that is to be stored to local memory storage (e.g., RAM, DRAM) at each compute node of the massively parallel system. However, in alternate embodiment, these types of data may be stored in a flash memory available at each node of the massively parallel system and/or may be stored in the node's associated scratch disk. It is understood that alternate embodiments contemplate various combinations of data storage as well, wherein data may be stored in each memory mode (local node memory, flash and/or disk).

Further, there is performed partitioning of the model, i.e., the model space/data is partitioned into sub-spaces for the multiple nodes to process them in parallel.

A next sequence of steps describes the RTM processing at each node after the partitioning.

Figure 5:
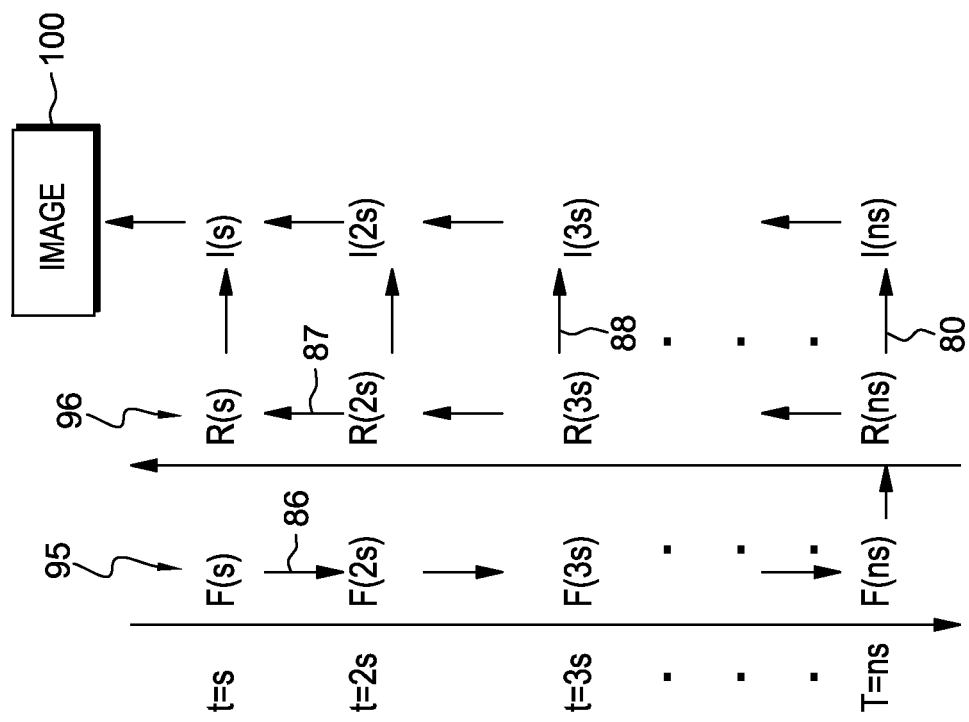
FIG. 5 depicts the forward path and backward path of the RTM method for calculating the imaging condition.

FIG. 5 shows a processing loop 72 performing the RTM seismic imaging algorithm in accordance with one embodiment. The RTM image data processing method 72 seeks to achieve an imaging condition of the sub-surface formations by calculating forward and reverse components of the propagating wave. Each of these steps, described herein with respect to FIG. 5 preferably employs local memory storage, e.g., a cache, for storing locally at the node memory, computed forward propagating wave components, however, can utilize local flash memory at the node and/or the attached scratch disk for the temporary storage as adaptively computed in the manner described herein. It is understood that the local memory storage device may include but is not limited to a local cache memory device or internal memory or onboard memory associated with a compute node, as it may include a node's internal memory, such as onboard DRAM chips.

In FIG. 5, there is calculated a forward propagation pressure wave, $P_S(x,y,z,t)$ at every timestep (for a single shot (having, e.g., 10-25 thousand time steps)). The forward power pressure wave $P_S(x,y,z,t)$ calculation at every $s^{th}$ timestep is either stored as a snapshot to node memory storage (alternately including storing to a flash memory and/or disk) every $s^{th}$ iteration in a forward propagation phase 95 of the algorithm 72. Each snapshot may include compressing the $P_S(x,y,x,t)$ (using an intra-wavefield compression) and then, writing of compressed $P_S(x,y,x,t)$ data to memory. As shown in FIG. 5, the forward pressure wave at every timestep t is represented as functions FW( ) and are calculated in forward order (e.g., time t=1, 2, 3, . . . ) in the process, as depicted by arrows 86. At some time instances t=ns, where n is an integer, the snapshot of the wavefield, e.g., FW(s), FW(2s), FW(3s), . . . , FW(ns), etc., is stored. As I/O bandwidth (i.e., write out and read back of computed wavefield data to/from a storage disk) is limited (as compared to CPU speed processing) and the local memory is also limited (i.e., write out and read back of computed wavefield data from/to an external memory (e.g., write to/read from a storage disk) is limited (as compared to CPU speed processing), the wavefield data FW( ) is compressed so that the compressed intra-wavefield FW( ) data may be written out faster or taking less local memory to store at these time steps (and read back in the backward (reverse propagation) path. Then, there is calculated reverse propagation, $P_R(x,y,z,t)$ at every t timestep (for a single shot having, e.g., 10-20 thousand time steps). That is, in a reverse propagation phase 96, the backward or reverse pressure wave represented as function BW( ) is calculated in reverse order according to the time steps. Furthermore, as the imaging condition requires matching forward wave calculated at the same time instance, the saved forward pressure wave snapshots are used. Thus, during the calculation of the reverse pressure wave data, when the image condition is required, the values for the forward propagation at the time instances are needed. The calculations performed in the reverse propagation phase 96 include: calculating reverse power pressure wave BW(t) (i.e., $P_R(x,y,z,t)$) at every time step according to the reverse time flow represented by arrows 87. The steps include, at each time step (in reverse order): calculating BW( ) at that step using reverse path wavefield equation, at the time instance when imaging condition is performed, reading the prior stored corresponding $P_S(x,y,x,t)$ compressed wavefield data FW(ns), FW((n−1)s), ..., FW(s) from disk to local memory, decompressing, and computing the imaging condition.

During these steps in reverse propagation phase 96 as depicted by arrows 88, there is further calculated the partial sum of the image, represented as function I( ) at each time step (in reverse order) beginning at time step 80. For example, at each step t=ks, the reverse propagation phase will include the calculating of the partial images I(ks) from the stored/loaded FW(ks) and BW(ks), I((k−1)s) values in reverse order, etc., until an image I(s) is computed at step 100. Note that the image is computed accumulatively.

Figure 6:
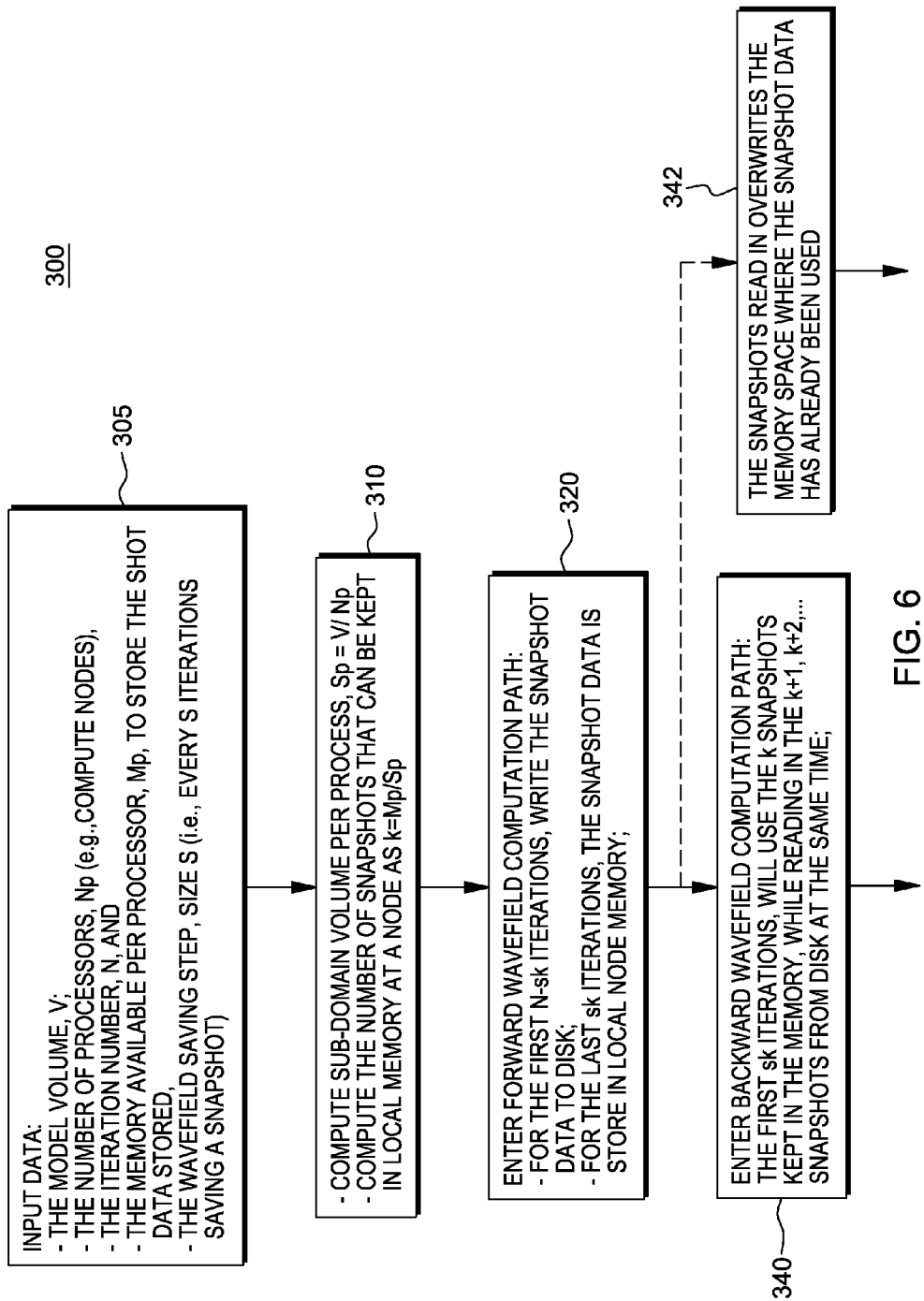
FIG. 6 outlines this methodology 300 for maximizing the memory usage to reduce computing Ttme for RTM and FWI Seismic Imaging

FIG. 6 depicts one embodiment of a partitioning scheme for partitioning memory between computation and intermediate results to optimize the RTM computation processing.

The processing of FIG. 6 determines what needs to be stored at each compute node in a parallel computing system) in order to minimize the delay latency (e.g., due to I/O performance bottleneck). This is because each node is responsible for a portion of the model (partitioned model domain) of a predetermined size). Each node has certain amount of internal memory, Mp; thus it can be calculated a portion of the model (a domain) at each node (a sub-volume size per node or "Sp").

That is, FIG. 6 shows the calculation of the exact number of wavefields that can be stored in a compute node's internal memory and which ones should be stored to external memory, e.g., a disk storage device, is shown with respect to FIG. 6. As many computing nodes are implemented to process domains in parallel, the volume space is sub-divided into a sub-volume (Sp) space, and each node calculates a sub-volume (sub-image) wherein at the end all sub-images are merged to create the final whole image. Each node is responsible for calculating a sub-volume (corresponding to a sub-image).

In the embodiment depicted in FIG. 6, the calculation is adaptive: at 305, there is first received as input: the given velocity model volume size V, and the number of processors Np (or nodes Np). In one embodiment, a node may have one or several processors. In a typical case, the memory available on a computer node is shared by all processors that node has. So in such case, it is determined for each processor, the amount of memory, the sub-model size, and the amount of the data can be kept for that processor, and the number of iterations N, the snapshot wavefield saving step size s (i.e., saving a snapshot wavefield for every "s" iterations), and the memory available per processor Mp to keep the snapshot wavefield data.

Then, at 310, there is determined the sub-domain volume per process Sp=V/Np. That is, the volume of sub-image is determined by dividing whole volume size over the number of nodes, i.e., Sp=V/Np (sub-volume size). Given a particular node, there is limited amount of memory for storing the snapshot. There can be calculated how much snapshots (i.e., number of wavefields) this amount of memory can store at the computing node. This number of wavefields stored in memory is computed according to: k=Mp/Sp.

Then, at 320, the process enters forward wavefield computation path: In the forward path processing, for the first (N−sk) iterations, the snapshot wavefield data will be written to disk (after "s" iterations). For the last "sk" iterations, the snapshot data will be kept in local node (internal) memory. In one embodiment, "s" is the period of the iterations to save a snapshot, e.g. s=3 or 5, means to save a snapshot after every 3 or 5 iterations. That is, there is saved a snapshot every s time steps (or iterations); "N" (is the total number of the iterations to be processed; k is a multiple integer to represent that at this particular time instance t=sk, i.e., t is a multiple of s. For example, in the forward path, for the first N−sk iterations, the (N−sk)/s wavefields of snapshot data will be written to disk, and for the last sk iterations, k wavefields of snapshot data will remain stored locally at the node.

In the backward path processing depicted at 340, FIG. 6, the first "sk" iterations will use the k snapshot wavefield data kept in the local memory, while reading in the snapshot wavefield data for the rest N−sk iterations from the external storage disk during the computing time of these 'sk' iterations. As indicated by optional step, the read in snapshots can overwrite the memory space where the snapshot wavefields have already been used as depicted at 342.

As mentioned, as a result of forward and backward propagating wave processing implemented in FIG. 5, and at steps 320, 340 in FIG. 6, the resulting partial images are then merged to obtain the completed image. As the processing depicted in FIG. 5 may be performed over multiple shots, a further determination will be made as to whether there are any more shots to be processed. If there are more shots to be processed, then the process continues to repeat FIG. 5 processing, however, using additional or new shot data obtained. If it is determined that there are no more shots (no more shot (or metashot) data) to be processed, the process concludes by outputting the final image.

This processing further determines the number of fields (snapshot) assumed stored at a node having a portion of the model (domain), and how many wavefields can be stored (written out) and which ones to be written out (and stored) to external memory.

In one aspect, disk I/O latency is reduced not when merging the computed images, but it is reduced because during calculations of the first N-ks iterations in the backward path, the snapshots needed for the last ks iterations can be read into memory from the disk and the disk reading time is overlapped within the backward wavefield computation time, i.e., it is "hidden".

Figure 7:
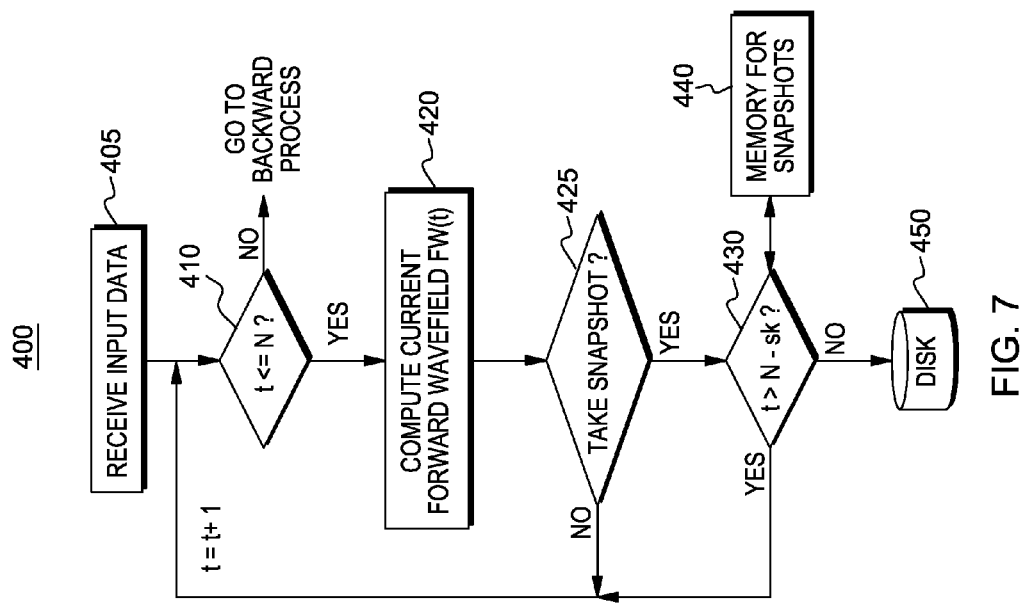
FIG. 7 shows the forward wavefield RTM processing methodology 400 in one embodiment.

FIG. 7 depicts forward wavefield RTM processing methodology 400 for maximizing the memory usage to reduce over all computing time for RTM and FWI Seismic Imaging.

As shown in FIG. 7, at 405, there is input the following data: Model Volume size V; Number of compute node Processors Np; Subvolume Sp=V/Np; Number of Time Iterations N; Memory for Snapshots per Processor Mp; and Snapshot Frequency=1/s. The number of snapshots to be kept in Memory k=Mp/Sp and an initial time step value t=0 are further specified.

Figure 8:
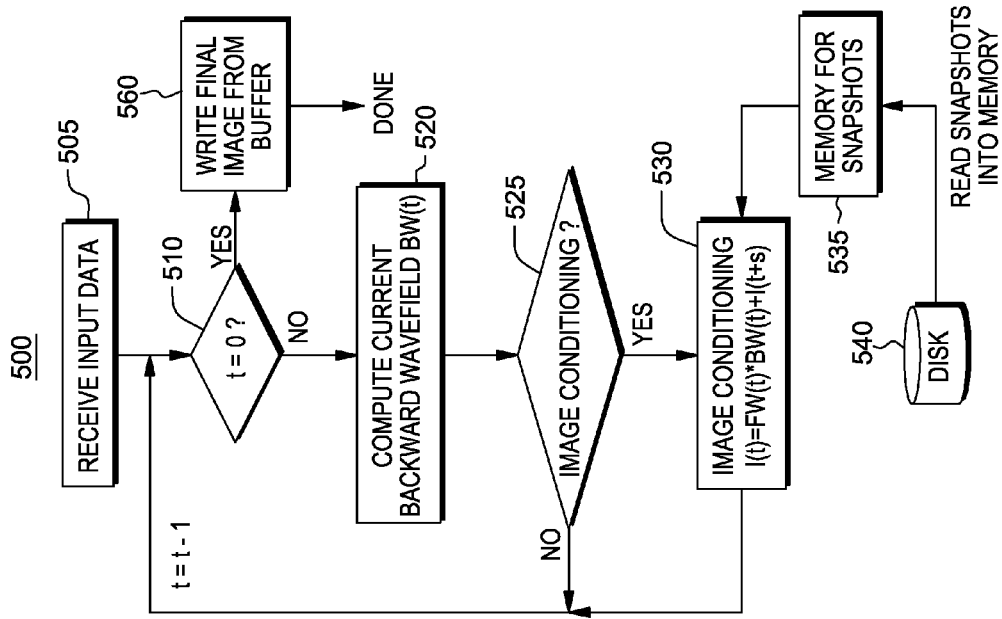
FIG. 8 shows the backward wavefield RTM processing methodology 500 in one embodiment.

At 410, a determination is first made as to whether the current iteration time "t" is at or prior to a time of a $N^{th}$ iteration which is the last snapshot processing time step of the forward wavefield RTM. If it is determined that the current iteration "t" time is greater than N, i.e., is not at or prior to iteration N, then the process proceeds to perform back propagation wavefield processing 500 as shown in FIG. 8. Otherwise, if it is determined that the current iteration "t" time is at or prior to iteration N, then the process proceeds to 420 where the current Forward Wavefield FW(t) is computed and intermediate results stored locally in the memory at the compute node. Continuing to 425, a determination is then made as to whether it is time to process a next snapshot. If not a time step in which a snapshot data is to be retrieved, then the time "t" is incremented according to t=t+1, and the process proceeds back to step 410 to again determine if the current time iteration "t" is not at or prior to iteration N and the process repeats. Otherwise, if at 425 it is determined that current time "t" is a time (e.g., t is a multiple of s) to process a next snapshot, then the process proceeds to 430, where a determination is made as to whether the current time step is greater than the value of N−sk, i.e., determine if t>(N−sk). If it is determined that current time t is greater than (N−sk), then, snapshot data is stored in compute node memory at 440 and not to disk storage. Otherwise, if it is determined that current time t is not greater than (N−sk), then snapshot data is now stored to that node's associated disk storage 450. In either event, the time "t" is incremented according to t=t+1, and the process proceeds back to step 410 to again determine if the current iteration "t" time is not at or prior to iteration N.

FIG. 8 shows the backward wavefield RTM processing methodology 500 in one embodiment.

As shown in FIG. 8, at 505, to start the backward migration process, there is input the Imaging Frequency=1/s, and an initial time step value t=N. At 510, a determination is first made as to whether the current iteration time "t" is of value zero, i.e., t=0. If at 510, it is determined that the current iteration time "t" is of value zero, i.e., t=0, then, the process proceeds to step 560 where the final merged images is written out as the Final Image from the buffer, and the process terminates.

Otherwise, if it is determined that the current iteration "t" time is not equal to zero, then the process proceeds to 520 where the current Backward Wavefield BW(t) is computed and intermediate results stored locally at the compute node.

Continuing to 525, a determination is then made as to whether a current "imaging condition" is to be performed. If it is found that a current "imaging condition" is not to be performed at 525, then the time "t" is incremented according to t=t−1, and the process proceeds back to step 510 to again determine whether the current iteration time "t" is of value zero, i.e., t=0. If, at 525, it is determined that a current imaging condition is to be performed, then the process proceeds to 530 where the calculation of the image condition is performed: I(t)=FW(t)*BW(t)+I(t+s) in doing so, the "k" previously kept snapshot data 530 in the memory is used first and then using the read-in snapshot data from external storage (e.g., disk 550), and the reading of the snapshot data from the disk is concurrent with the processing time of the first sk iterations in the backward path and the process returns back to step 510 to determine the time check and the process 500 repeats.

In an alternate embodiment, with respect to FIG. 7, in the computing of a forward propagating wave calculation, for the first N−sk iterations, only the boundary data will be kept in the memory after every "s" iterations. For the last sk iteration, the snapshot data will be kept in memory. That is, during the first N−sk steps, only the boundary data of the wavefields will be saved to the disk. For the last sk, the k wavefields will be kept in memory; Further, in the reverse propagating wave calculation, the first sk steps will use the wavefields kept in the memory, while reading in the boundary data of s(k+1), s(k+2), . . . , wavefields from disk at the same time; During the rest N−sk steps, the forward wavefields will be recalculated from the boundary data.

In a further alternate embodiment, with respect to FIG. 7, if the disk I/O time (e.g., read time) can not be entirely hidden by the computation time of the "sk" time steps in the backward path, and the memory is not enough to keep all the snapshot data in the memory, in the forward path, the over all processing time can be reduced by the following: 1) During the first sk iterations, storing the k snapshot wavefields of the first sk iterations to disk; 2) Keeping the boundaries of the m snapshot wavefields for the next "sm" iterations in the memory, where "m" is the number of the snapshots that only the boundaries of them will be kept in the memory; and 3) keeping the (N−sk−sm)/s snapshot wavefields needed in the memory in the last N−sk−sm iterations. In doing so, the goal is to minimize "m" and maximize N−sk−sm such that the disk I/O (e.g., disk read) time can be completely hidden and the boundary recovery time is minimized. It is understood that a determination of "m" may be based on one or more factors including, but not limited to: the volume of the wavefield snapshot, the memory available for storing snapshots, the disk read speed, and the computation time for each iteration. Accordingly, the alternate embodiment helps minimize the additional computing time required to recover the wavefield snapshots from the stored boundary data so the total processing time is reduced.

In one example embodiment, the present system and method operates in a massively parallel computing system such as the Blue Gene® Q (available from International Business Machines, Inc.) computing system.

The method implemented in the Blue Gene Q System® uses its aggregate memory as a high performance data fabric for handling intermediate data in Reverse Time Migration (RTM) seismic imaging process thereby alleviating the disk storage requirements in conventional RTM processing and thus reducing the cost of the system.

The total aggregate memory of the Blue Green® Q computing system is distributed in the style of a multi-node computer. With each compute node supporting up to 16 GB physical memory, a rack of the Blue Gene® Q system can have up to 16 TB aggregate memory.

The Blue Gene® Q system makes use of its torus network configuration as a high performance data communication mechanism for partitioning each shot gathered among a subset of the Blue Gene® nodes and performing RTM seismic imaging in a collaboration fashion. Processing performance is improved by alleviating disk I/O operations during the course of the RTM processing.

Further details regarding implementation of Blue Gene/Q high performance computer can be found in IBM System Blue Gene Solution: Blue Gene/Q Application Development, IBM Redbooks, the entire contents and disclosure of which is incorporated by reference as if fully set forth herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a circuit, module or system. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction. The containment (or storage) of the program may be non-transitory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

I claim:

1. A method for managing available memory at computing devices to reduce seismic imaging computation time, said method comprising:
    partitioning a model space volume as domains over a multiple number of computing nodes, each node having one or more associated processors and a first local memory storage device;
    assigning each partitioned domain to one or more processing nodes of a parallel computer device interconnected through one or more communication networks;
    determining an available amount of first local memory storage at each node;
    determining a sub-volume size per node corresponding to domain model processing;
    determining from said available amount of first memory and sub-space volume size a first amount of iterations corresponding to determined time steps at which forward wave propagation data is computed for storage;
    wherein during an iterative processing in a forward wavefield propagation calculation path, storing computed forward wavefield data contributions for said first amount of time steps needed to a second external memory storage device;
    in each remaining time steps, storing the computed forward wavefield data contributions in said available first memory; and
    wherein during an iterative processing in a backward wavefield propagation calculation path, using the stored computed forward wavefield data contributions from the available first memory during said first amount of time steps to compute reverse wave propagation data in said backward calculation path, and
    in a remaining time steps, using the stored computed forward wavefield data contributions from the second memory storage device to compute reverse wave propagation data; and, computing, using said stored forward wave propagation data and reverse wave propagation data, an image at each node, and, merging said computed images from each node to create a final image.

2. The method as claimed in claim 1, wherein said first amount of time steps for computing and storing said computed forward wavefield data contributions to said second memory storage device is a number of N−sk time steps, where N is a total number of iterations needed for computing an image, "s" is a frequency at which computed forward wave is saved to a memory; and, k is an index integer relating said frequency "s" to a time "t" such that t=sk.

3. The method as claimed in claim 2, wherein said second external memory storage device is a disk or tape storage device associated with one or more compute nodes.

4. The method as claimed in claim 3, wherein said first local memory storage device is a local cache memory device or internal memory or onboard memory associated with a compute node.

5. The method as claimed in claim 4, wherein remaining forward wavefield data contributions are computed and stored to said available first local memory storage stored during a remaining sk time steps.

6. The method as claimed in claim 5, wherein during iterative processing in a backward wavefield propagation calculation path, using the stored computed forward wavefield data contributions from the available first memory during a first sk time steps to compute reverse wave propagation data in said backward calculation path, and in a remaining N−sk time steps, using the stored computed forward wavefield data contributions from the second memory storage device to compute reverse wave propagation data.

7. The method as claimed in claim 1, wherein said first amount of iterations correspond to a number of shot wavefields that can be stored in the first local memory storage is computed according to: k=Mp/Sp, where Mp is the determined amount of available memory per compute node and Sp is the determined sub-volume size per node.

8. The method as claimed in claim 6, wherein said using the stored computed forward wavefield data contributions during a first sk time steps comprises:

using in the available first local memory storage, at each iteration, the computed forward wavefield data contributions for computing said reverse wave propagation data, while computing said reverse wave propagation data in said backward calculation path during said sk time steps, reading in the stored computed forward wavefield data contributions for the remaining N−sk time steps from said second external memory storage device.

9. The method as claimed in claim 7, further comprising: overwriting the available first local amount of memory space with computed forward wavefield data of the first [N−sk] time steps while computing said reverse wave propagation data in said backward calculation path during said sk time steps.

10. The method as claimed in claim 2, further comprising: varying the s value representing the iteration step size for each shot wavefield to be stored in the memory.

11. The method as claimed in claim 1, wherein during N−sk iterations, computing and storing only a forward wavefield boundary data in the second external memory storage memory after every s iterations; and, during said remaining sk iterations, storing said computed forward wave propagation data in said first available local memory storage device.

12. The method as claimed in claim 11, wherein during said sk steps, computing the reverse wavefield propagating data using said computed forward wave propagation data in the first available memory, while concurrently reading in said stored wavefield boundary data of stored forward wavefields of s(k+1), s(k+2), . . . iterations from the second external memory; and, during remaining N−sk steps, computing the forward wavefield propagation data from the stored boundary data, wherein said concurrent reading of said stored wavefield boundary data of stored forward wavefields is hidden by the computation time of the "sk" time steps in the backward propagating path.

13. The method as claimed in claim 11, wherein during sk time steps, computing and storing a "k" number of forward shot wavefields of the first sk iterations to said second external memory storage;

storing computed forward shot wavefield boundary data in said first local memory storage of an amount m snapshot wavefields for a next sm iterations in the memory where m is a number of the computed wavefield shots; and storing an amount (N−sk−sm)/s snapshot wavefields in the first available local memory in a last N−sk−sm iterations so that the computation time of the first N−(s+m)k iterations in the backward propagation path is substantially equal to the reading time of the snapshots wavefields from the external memory and minimize a value of m.

* * * * *